United States Patent
Kanaya et al.

(10) Patent No.: US 9,139,132 B2
(45) Date of Patent: Sep. 22, 2015

(54) VEHICLE APPROACH INFORMATION DEVICE WITH INDICATOR TO THE DRIVER

(71) Applicant: Fuji Jukogyo Kabushiki Kaisha, Tokyo (JP)

(72) Inventors: Hiroaki Kanaya, Tokyo (JP); Takuya Itoh, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 14/169,032

(22) Filed: Jan. 30, 2014

(65) Prior Publication Data

US 2014/0225726 A1     Aug. 14, 2014

(30) Foreign Application Priority Data

Feb. 13, 2013   (JP) ................... 2013-025365

(51) Int. Cl.
    *G08B 21/00*      (2006.01)
    *B60Q 5/00*      (2006.01)

(52) U.S. Cl.
    CPC ....................... *B60Q 5/008* (2013.01)

(58) Field of Classification Search
    CPC ................ B60Q 5/006; B60Q 5/008
    USPC ............ 340/435, 436, 437, 463, 903; 701/36
    See application file for complete search history.

(56) References Cited

U.S. PATENT DOCUMENTS

| | | | |
|---|---|---|---|
| 8,958,947 B2 * | 2/2015 | Inakazu et al. | ................. 701/36 |
| 2014/0210602 A1 | 7/2014 | Yokoyama et al. | |
| 2014/0226835 A1 | 8/2014 | Kanaya et al. | |

FOREIGN PATENT DOCUMENTS

| | | |
|---|---|---|
| JP | 2006-0298111 | 11/2006 |
| JP | 2009-040318 | 2/2009 |
| JP | 2011-148435 | 8/2011 |
| JP | 2012-201316 | 10/2012 |
| WO | 2011/104755 | 9/2011 |

* cited by examiner

*Primary Examiner* — Jeffery Hofsass
(74) *Attorney, Agent, or Firm* — Smith, Gambrell & Russell, LLP

(57) ABSTRACT

A vehicle approach informing device includes: an informing sound output unit configured to output informing sound for informing a pedestrian outside a vehicle that the vehicle is approaching when a predetermined condition is satisfied; a stop operation unit configured to receive an operation for stopping the output of the informing sound by the informing sound output unit; and an information output unit configured to output predetermined information to a driver. When the predetermined condition is satisfied and output of the informing sound by the informing sound output unit is stopped by an operation of the stop operation unit, the information output unit outputs information to the driver, the information indicating that the informing sound is not outputted.

8 Claims, 4 Drawing Sheets

VEHICLE APPROACH INFORMATION DEVICE WITH INDICATOR TO THE DRIVER

CROSS-REFERENCE TO RELATED APPLICATIONS

The present application claims priority from Japanese Patent Application No. 2013-025365 filed on Feb. 13, 2013, the entire contents of which are hereby incorporated by reference.

BACKGROUND

1. Technical Field

The present invention relates to a vehicle approach informing device configured to inform pedestrians and the like outside a vehicle that the vehicle is approaching.

2. Related Art

Conventional vehicle are primarily a gasoline-powered vehicle which runs using an engine as a drive source, and so a pedestrian can identify the presence of a vehicle by the engine sound generated by the vehicle when the vehicle is approaching from the rear or a blind spot of the pedestrian. However, no engine sound is generated by a vehicle such as an electric vehicle and a hybrid vehicle which run using an electric motor as a drive source, and it is difficult for a pedestrian to recognize whether the vehicle is approaching, by the sound of the vehicle.

Thus, vehicles equipped with an informing device have been proposed, the informing device being configured to output sound for informing people outside the vehicle such as pedestrians that the vehicle is approaching. For example, Japanese Unexamined Patent Application Publication No. 2009-40318 discloses a vehicle approach informing device configured to output simulated sound of tire noise from a speaker provided at the front end of a vehicle when the vehicle is running at a speed lower than or equal to a predetermined vehicle speed, the simulated sound having the same tone as that of the actual tire noise.

However, the sound for informing vehicle approach may be an annoying noise to the driver and the surroundings. For example, output of informing sound in a garage may be an annoying noise to the driver because the sound reverberates through the garage. For another example, a driver frequently drives the vehicle at a low speed in an area near the residence thereof, thus the sound for informing vehicle approach is constantly emitted, thereby causing an annoying noise to the neighbors.

In order to prevent the informing sound from being an annoying noise, an approach may be taken that allows a driver to disable the output of the informing sound at the driver's will. With this approach, the output of the informing sound is disabled at a place where the driver thinks that informing sound may cause an annoying noise, and thus the informing sound can be prevented from being an annoying noise. However, because informing sound is outputted to the outside of the vehicle, the driver inside the vehicle may continue to drive without being aware that the output of the informing sound has been stopped. In such a case, while the driver is not aware that the output of the informing sound has been stopped, a pedestrian may not be aware that the vehicle is approaching.

SUMMARY OF THE INVENTION

The present invention has been designed in consideration of the circumstances described above, and an object thereof is to provide a vehicle approach informing device which can prevent a driver from being unaware that the output of the informing sound has been disabled.

An aspect of the present invention provides a vehicle approach informing including: an informing sound output unit to output informing sound for informing a pedestrian outside a vehicle that the vehicle is approaching when a predetermined condition is satisfied; a stop operation unit to receive an operation for stopping the output of the informing sound by the informing sound output unit; and an information output unit to output predetermined information to a driver. When the predetermined condition is satisfied and output of the informing sound by the informing sound output unit is disabled by an operation of the stop operation unit, the information output unit outputs information to the driver, the information indicating that the informing sound is disabled.

The information output unit may include a display unit to display information, and outputs information to a driver by displaying the information on the display unit.

The predetermined condition may be that a running speed of the vehicle is lower than or equal to a predetermined speed.

The predetermined condition may also be that an approaching object is within a predetermined distance from the vehicle.

DETAILED DESCRIPTION

Figure 1:
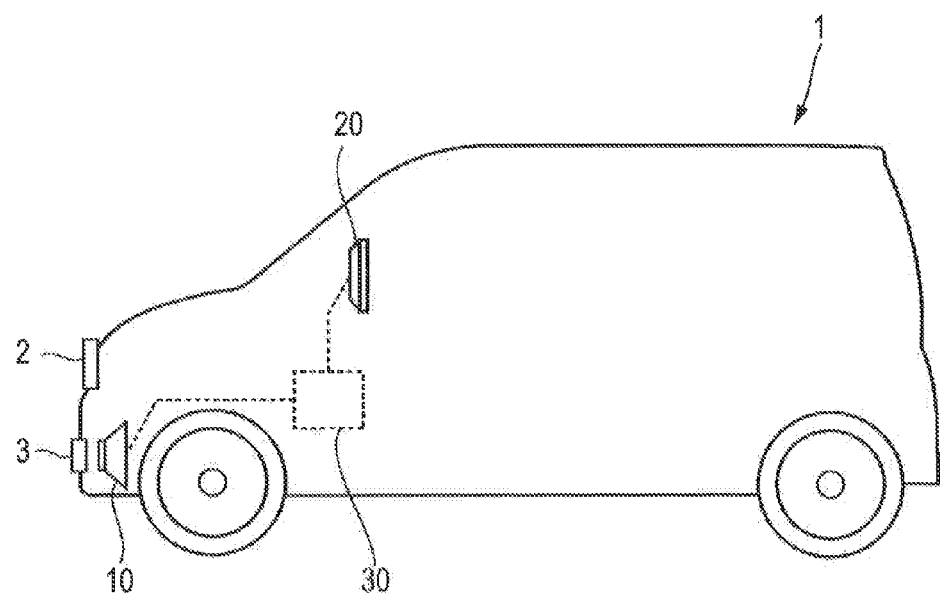
FIG. 1 is an overall configuration diagram of a vehicle.

Hereinafter, a preferable implementation of the present invention is described in detail with reference to the accompanying drawings. As illustrated in FIG. 1, a vehicle 1 provided with a vehicle approach informing device according to the implementation includes informing speakers 10 outputs informing sound, a touch panel display 20 to allow touch operation and display of information, and a vehicle approach informing controller 30 connected to the informing speaker 10 and the touch panel display 20. In this implementation, the informing speaker 10 corresponds to the informing sound output unit of the present invention, and the touch panel display 20 corresponds to the information output unit and the stop operation unit of the present invention.

The informing speakers 10 are respectively disposed near rear surfaces of a pair of right and left fog lamps 3 which are disposed below headlights 2 at the front end of the vehicle 1. The informing speaker 10 outputs informing sound to the outside of the vehicle 1. The diaphragm of each informing speaker 10 is cone type and disposed to face the rear of the vehicle 1. In this implementation, the vehicle 1 includes two pieces of the informing speaker 10. However, without being limited to this, the vehicle 1 may include, for example, one piece of the informing speaker 10 or further additional pieces of the informing speaker 10 at the rear or a side of the vehicle 1.

The touch panel display 20 is disposed near the driver's seat of the vehicle 1 and operable by the driver. The driver can disable or enable the informing sound for informing the approach of the vehicle 1 to the outside by touching an informing sound setting button displayed on the touch panel display 20. In addition, the touch panel display 20 displays various pieces of information including a warning to the driver. A navigation system may be used for the touch panel display 20. In this implementation, the informing sound setting button is displayed on the touch panel display 20. However, without being limited to this, a toggle switch or a push switch for switching between disabling and enabling the output of the informing sound may be provided on the driver's seat.

Figure 2:
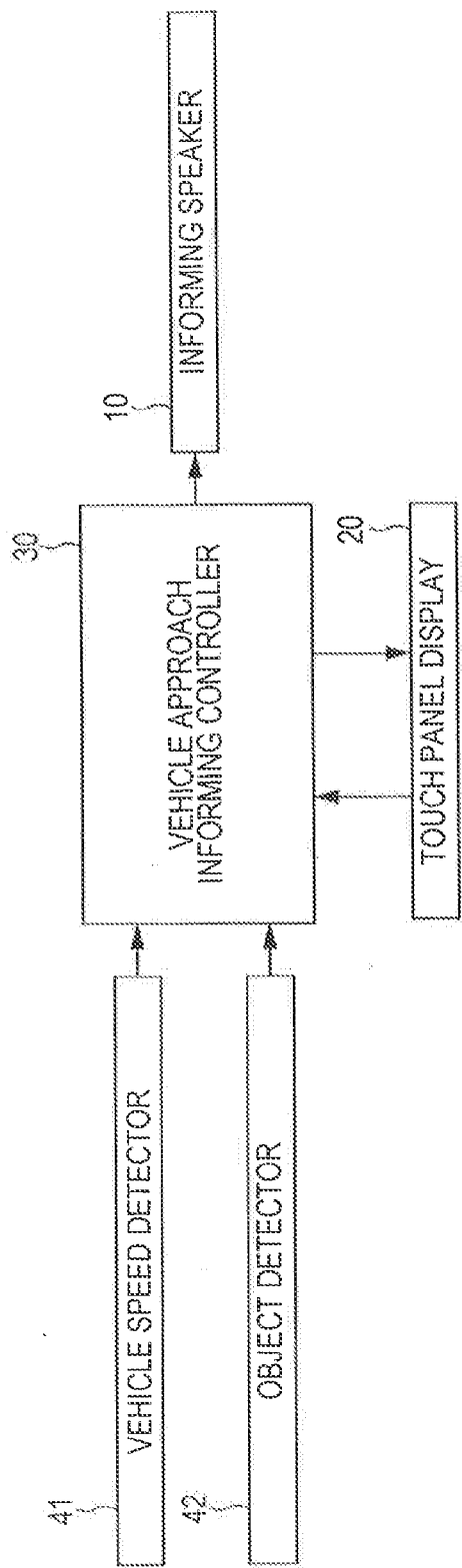
FIG. 2 is a block diagram of a vehicle approach informing device.

As illustrated in FIG. 2, the output side of the vehicle approach informing controller 30 is electrically connected to the informing speaker 10 and the touch panel display 20. Accordingly, an informing sound output signal is outputted from the vehicle approach informing controller 30 to the informing speaker 10 and an information output signal is outputted to the touch panel display 20.

The input side of the vehicle approach informing controller 30 is electrically connected to the touch panel display 20, a vehicle speed detector 41 for detecting the running speed (vehicle speed) of the vehicle 1, and an object detector 42 for detecting an object in a predetermined range ahead in the running direction of the vehicle 1. Consequently, the vehicle approach informing controller 30 receives operation information from the touch panel display 20, a vehicle speed detection signal from the vehicle speed detector 41, and an object detection signal from the object detector 42.

The vehicle speed detector 41 outputs a vehicle speed detection signal when detecting that the speed of the vehicle 1 is lower than or equal to a predetermined vehicle speed (30 km/h in this implementation).

The object detector 42 is a radar which is disposed at the front end of the vehicle 1, and detects an approaching object (such as a pedestrian or a light vehicle lacking a motor such as a bicycle) in a predetermined range (within 5 m in this implementation) ahead of the vehicle 1 using electromagnetic waves. In this implementation, the object detector 42 is a radar to detect an object using electromagnetic waves. However, without being limited to this, the object detector 42 may be, for example, a camera configured to analyze a captured image of an area ahead of the vehicle 1 and to detect an object, or a sonar configured to detect an object using ultrasonic waves. Another object detector 42 may be provided also at the rear of the vehicle 1 to detect an object in a predetermined range behind the vehicle 1 when the vehicle 1 drives backward.

The vehicle approach informing controller 30 is an electronic control unit (ECU), which performs a procedure for informing the approach of the vehicle 1 to pedestrians outside by analyzing various input signals and outputting informing sound output signals to the informing speaker 10. The vehicle approach informing controller 30 also performs a procedure for displaying a warning by outputting a warning display control signal to the touch panel display 20.

Figure 3:
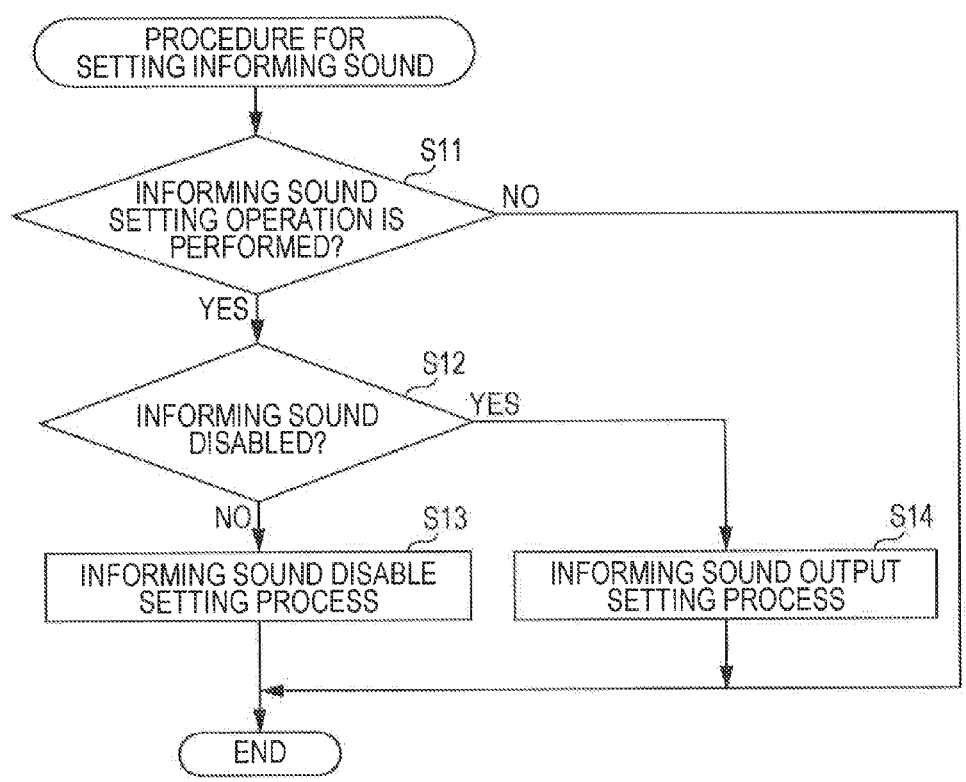
FIG. 3 is a flow chart illustrating an informing sound setting procedure.

Hereinafter, an informing sound setting procedure for changing the output setting of informing sound will be described with reference to FIG. 3, the informing sound for informing the approach of the vehicle 1 to the outside. The procedure flow illustrated in FIG. 3 is performed for every predetermined period (for example, 4 milliseconds).

First, in step S11, the vehicle approach informing controller 30 determines whether or not the informing sound setting button displayed on the touch panel display 20 is operated. The informing sound setting button is a switch for changing the informing sound setting and displayed on the screen of the touch panel display 20. When operation information is inputted from the touch panel display 20, the operation information indicating the informing sound setting button has been touched, the procedure proceeds to step S12. When the operation information is not inputted from the informing sound setting button, the informing sound setting procedure is terminated.

In step S12, the vehicle approach informing controller 30 determines whether or not the output of informing sound is disabled, the informing sound for informing approach of the vehicle 1 to the outside. Specifically, it is determined whether or not an informing sound output flag is set to OFF, the informing sound output flag being stored in a random access memory (RAM) included in the vehicle approach informing controller 30. When the informing sound output flag is set to ON, the informing sound for informing the approach of the vehicle 1 to the outside can be outputted; and when the informing sound output flag is set to OFF, the informing sound for informing the approach of the vehicle 1 to the outside is stopped. When the output of the informing sound is enabled, the procedure proceeds to step S13; and when the output of the informing sound is disabled, the procedure proceeds to step S14.

In step S13, the vehicle approach informing controller 30 disables the output of the informing sound for informing the approach of the vehicle 1 to the outside. Specifically, the vehicle approach informing controller 30 sets the informing sound output flag to OFF, the informing sound output flag being stored in the RAM included in the vehicle approach informing controller 30. In this manner, the output of informing sound is disabled, the informing sound for informing of approach of the vehicle 1 to the outside.

In step S14, the vehicle approach informing controller 30 enables the output of the informing sound for informing the approach of the vehicle 1 to the outside. Specifically, the vehicle approach informing controller 30 sets the informing sound output flag to ON, the informing sound output flag being stored in the RAM included in the vehicle approach informing controller 30. In this manner, the output of informing sound is enabled, the informing sound for informing of approach of the vehicle 1 to the outside.

Figure 4:
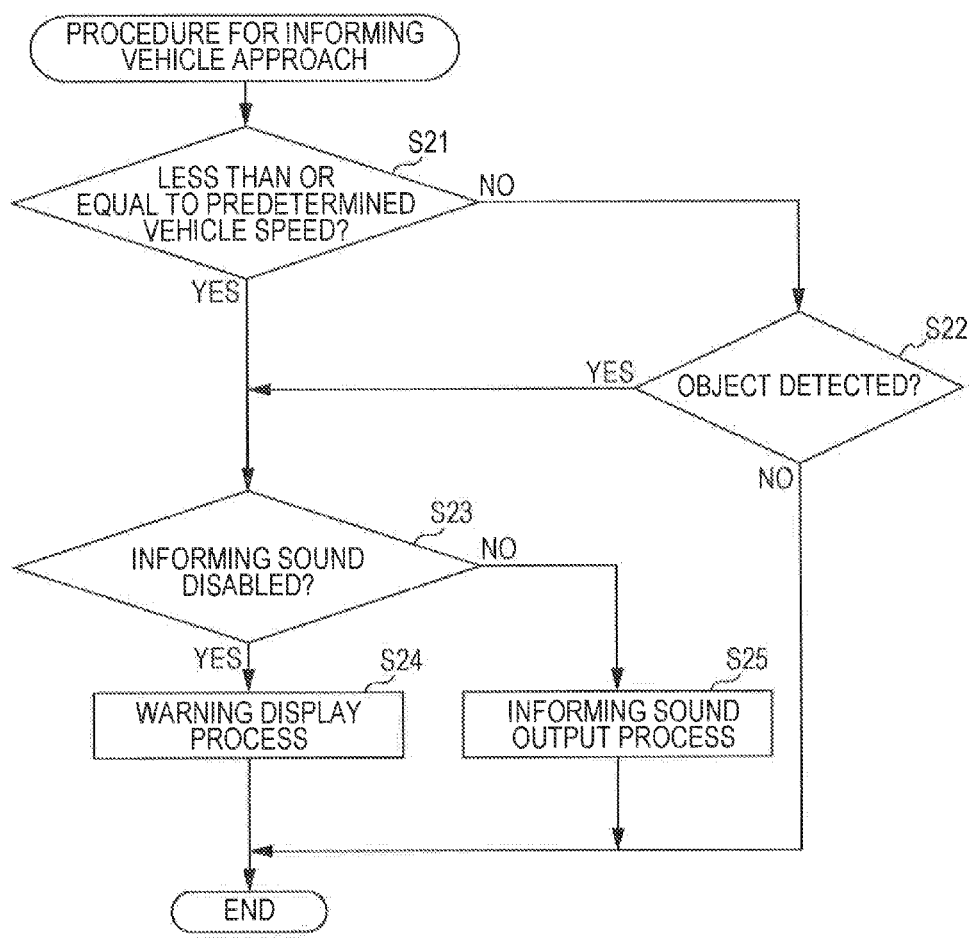
FIG. 4 is a flow chart illustrating a vehicle approach informing procedure.

Hereinafter, a vehicle approach informing procedure for informing the approach of the vehicle 1 to the outside will be described with reference to FIG. 4. The procedure flow illustrated in FIG. 4 is performed for every predetermined period (for example, 4 milliseconds).

First, in step S21, the vehicle approach informing controller 30 determines whether or not the speed of the vehicle 1 is lower than or equal to the predetermined vehicle speed (30 km/h). Specifically, when a detected vehicle speed signal is inputted from the vehicle speed detector 41, it is determined that the speed of the vehicle 1 is lower than or equal to the predetermined vehicle speed; and when no detected vehicle speed signal is inputted from the vehicle speed detector 41, it is determined that the speed of the vehicle 1 is higher than the predetermined vehicle speed. When it is determined that the speed of the vehicle 1 is lower than or equal to the predetermined vehicle speed, the procedure proceeds to step S23; and when it is determined that the speed of the vehicle 1 is higher than the predetermined vehicle speed, the procedure proceeds to step S22.

In step S22, the vehicle approach informing controller 30 determines whether or not an object such as a pedestrian and a bicycle is present in a predetermined range (5 m) ahead in the running direction of the vehicle 1. Specifically, when an object detection signal is inputted from the object detector 42, it is determined that an object is present in the predetermined range; and when no object detection signal is inputted, it is determined that no object is present in the predetermined range. When it is determined that an object is present in the predetermined range ahead in the running direction of the vehicle 1, the procedure proceeds to step S23; and when it is determined that no object is present in the predetermined range ahead in the running direction of the vehicle 1, the vehicle approach informing procedure is terminated.

In step S23, the vehicle approach informing controller 30 determines whether or not the output of the informing sound for informing of approach of the vehicle 1 to the outside is disabled. Specifically, it is determined whether or not an informing sound output flag is set to OFF, the informing sound output flag being stored in the RAM included in the vehicle approach informing controller 30. When it is determined that the output of the informing sound for informing the approach of the vehicle 1 to the outside is disabled, the procedure proceeds to step S24. When it is determined that the output of the informing sound for informing the approach of the vehicle 1 to the outside is not disabled (when the output of the informing sound is enabled), the procedure proceeds to step S25.

In step S24, the vehicle approach informing controller 30 performs a process of displaying the warning on the touch panel display 20. Specifically, an information output signal is outputted for displaying the warning on the touch panel display 20. Thus, the warning such as "the informing sound is stopped" is displayed on the touch panel display 20, the warning informing the driver that output of the informing sound for informing of approach of the vehicle 1 to the outside is disabled.

In step S25, the vehicle approach informing, controller 30 performs an informing process of outputting informing sound from the informing speaker 10, the informing sound for informing the approach of the vehicle 1 to the outside. Specifically, the vehicle approach informing controller 30 outputs an informing sound output signal for outputting informing sound to the informing speaker 10. In this manner, informing sound is outputted from the informing speaker 10.

As described above, when the speed of the vehicle 1 is lower than or equal to the predetermined vehicle speed or an object is present in the predetermined range ahead in the running direction of the vehicle 1, informing sound is outputted from the informing speaker 10 so as to inform the approach of the vehicle 1 to the outside. However, when the output of informing sound is disabled by the driver's informing sound setting operation, even when the speed of the vehicle 1 is less than or equal to the predetermined vehicle speed, or an object is present in the predetermined range ahead in the running direction of the vehicle 1, informing sound is not outputted from the informing speaker 10. In this manner, for example, in an area near the residence of the driver where the driver thinks that informing sound may cause an annoying noise, the output of informing sound can be stopped, and thus a nuisance to the neighbors can be prevented.

When the output of informing sound is disabled, and the vehicle 1 runs at a speed lower than or equal to the predetermined vehicle speed or an object is detected in the predetermined range ahead in the running direction of the vehicle 1, the warning is displayed on the touch panel display 20 so as to inform the driver that the output of informing sound is disabled. In this manner, when the output of the informing sound is disabled and a situation occurs in which the informing sound needs to be outputted, the warning is displayed on the touch panel display for indication 20. Consequently, the driver is prevented from continuing to drive the vehicle without being aware that the output of the informing sound has been stopped when the informing sound is supposed to be outputted.

When the driver is listening to music or talking with a fellow passenger, it is difficult for the driver to hear other sound. Thus, the driver is not likely to recognize that the output of informing sound to the outside has been stopped. In such a case, even when the driver is informed by a sound that the output of the informing sound is disabled, the driver may be unaware of the sound. However, the driver is informed by the display of the warning on the touch panel display 20 instead of sound, and thus the driver is informed reliably.

In this implementation, the warning is displayed on the touch panel display 20. However, without being limited to this, for example, the driver's seat may be provided with a display exclusively for displaying the warning, or the warning may displayed on a meter display. In addition, the warning may be cleared after elapse of a predetermined time (for example, 10 seconds) or in response to the driver's operation on the touch panel display 20 or in response to a change in the setting for the output of the informing sound.

In addition, in this implementation, the warning is displayed on the touch panel display 20 when the output of the informing sound is disabled and the vehicle 1 runs at a speed lower than or equal to a predetermined vehicle speed or an object is present in a predetermined range ahead in the running direction of the vehicle 1. However, without being limited to this, for example, the warning may be displayed when the vehicle 1 runs at a speed lower than or equal to a predetermined vehicle speed, and an object is present in a predetermined range ahead in the running direction of the vehicle 1.

The invention claimed is:

1. A vehicle approach informing device comprising:
an informing sound output unit to output informing sound for informing a pedestrian outside a vehicle that the vehicle is approaching when a predetermined condition is satisfied;
a stop operation unit to receive an operation for stopping the output of the informing sound by the informing sound output unit; and
an information output unit configured to output predetermined information to a driver,
wherein when the predetermined condition is satisfied and output of the informing sound by the informing sound output unit is disabled by an operation of the stop operation unit, the information output unit outputs information to the driver, the information indicating that the informing sound is disabled.

2. The vehicle approach informing device according to claim 1, wherein the information output unit includes a display unit configured to display information, and outputs information to a driver by displaying the information on the display unit.

3. The vehicle approach informing device according to claim 1, wherein the predetermined condition is that a running speed of the vehicle is lower than or equal to a predetermined speed.

4. The vehicle approach informing device according to claim 2, wherein the predetermined condition is that a running speed of the vehicle is lower than or equal to a predetermined speed.

5. The vehicle approach informing device according to claim 1, wherein the predetermined condition is that an approaching object is within a predetermined distance from the vehicle.

6. The vehicle approach informing device according to claim 2, wherein the predetermined condition is that an approaching object is within a predetermined distance from the vehicle.

7. The vehicle approach informing device according to claim 1, wherein the predetermined condition is either one of a) and b) or both,
- a) an approaching object is within a predetermined distance from the vehicle, and
- b) a running speed of the vehicle is lower than or equal to a predetermined speed.

8. The vehicle approach informing device according to claim 7, wherein the predetermined condition is satisfied when both a) and b) are satisfied.

* * * * *